United States Patent
Guo et al.

(10) Patent No.: US 9,160,389 B2
(45) Date of Patent: Oct. 13, 2015

(54) RADIO RECEIVER FOR POLARIZED ANTENNA SYSTEM

(75) Inventors: Zhiheng Guo, Beijing (CN); Hai Wang, Beijing (CN); Ruiqi Zhang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 17 days.

(21) Appl. No.: 14/351,556

(22) PCT Filed: Oct. 19, 2011

(86) PCT No.: PCT/CN2011/001739
§ 371 (c)(1),
(2), (4) Date: Apr. 11, 2014

(87) PCT Pub. No.: WO2013/056393
PCT Pub. Date: Apr. 25, 2013

(65) Prior Publication Data
US 2014/0242934 A1    Aug. 28, 2014

(51) Int. Cl.
*H04B 7/00*      (2006.01)
*H04B 1/16*      (2006.01)
*H04B 7/08*      (2006.01)
*H04B 7/10*      (2006.01)
*H04B 7/06*      (2006.01)

(52) U.S. Cl.
CPC ............... *H04B 1/16* (2013.01); *H04B 7/0691* (2013.01); *H04B 7/0857* (2013.01); *H04B 7/10* (2013.01)

(58) Field of Classification Search
CPC ........................................................ H04B 7/0691
USPC ............................ 455/273, 272, 277.1, 277.2
See application file for complete search history.

(56) References Cited

U.S. PATENT DOCUMENTS

| | | | | |
|---|---|---|---|---|
| 5,068,668 A | * | 11/1991 | Tsuda et al. | 342/362 |
| 5,691,727 A | * | 11/1997 | Cyzs | 342/361 |
| 6,173,014 B1 | | 1/2001 | Forssen et al. | |
| 6,469,680 B1 | * | 10/2002 | Kelliher | 343/893 |

(Continued)

FOREIGN PATENT DOCUMENTS

| | | |
|---|---|---|
| CN | 1579035 | 2/2005 |
| EP | 1 248 386 A1 | 10/2002 |

(Continued)

OTHER PUBLICATIONS

European Search Report for International Application No. PCT/CN2011/001739, mailed Apr. 1, 2015, 8 pages.

(Continued)

*Primary Examiner* — Sanh Phu
(74) *Attorney, Agent, or Firm* — Nicholsen De Vos Webster & Elliott, LLP

(57) ABSTRACT

A hybrid combining method in a receiver is provided, and the method includes that wideband combining, e.g. using a maximum ratio combining (MRC) or an interference rejection combing (IRC) process, to combine signals distributed over a first plurality of subcarrier frequencies from antennas in the same polarization direction is performed, resulting in a combined signal for each polarization direction that is distributed over a smaller number of subcarrier frequencies, then a two-port narrowband IRC is done of these wideband combined signals for the two polarization directions, resulting in a diversity combined signal.

14 Claims, 2 Drawing Sheets

(56) References Cited

U.S. PATENT DOCUMENTS

| | | | |
|---|---|---|---|
| 7,003,324 B2 * | 2/2006 | Hiramatsu | 455/562.1 |
| 7,269,238 B2 | 9/2007 | Lee et al. | |
| 8,306,473 B2 * | 11/2012 | Anreddy et al. | 455/39 |
| 2004/0125880 A1 * | 7/2004 | Emami et al. | 375/260 |
| 2011/0065390 A1 | 3/2011 | Asplund et al. | |

FOREIGN PATENT DOCUMENTS

| | | |
|---|---|---|
| EP | 1246386 | 10/2002 |
| EP | 1248386 A1 | 10/2002 |
| EP | 2031768 A1 | 8/2007 |
| WO | WO-97/40588 A1 | 10/1997 |
| WO | WO-2007/094622 A1 | 8/2007 |
| WO | WO-2011/100858 A1 | 8/2011 |
| WO | WO-2012/075604 A1 | 6/2012 |

OTHER PUBLICATIONS

PCT International Search Report for PCT Application No. PCT/CN2011/001739; dated Jul. 19, 2012; 4 pages.

Villemaud, Guillaume, "*Coupled Simulation-Measurements Platform for the Evaluation of Frequency Reuse in the 2.45 GHz ISM Band for Multimode Nodes with Multiple Antennas*;" Hindawi Publishing Corp.; EURASIP Journal on Wireless Commctns. and Netwrkg.; vol. 2010; Article IDS 302151; 11 pages; 2010.

PCT International Preliminary Report on Patentability for PCT Application No. PCT/CN2011/001739, dated Apr. 22, 2014; 7pgs.

* cited by examiner

RADIO RECEIVER FOR POLARIZED ANTENNA SYSTEM

CROSS-REFERENCE TO RELATED APPLICATIONS

This application is a National stage of International Application No. PCT/CN2011/001739, filed Oct. 19, 2011, which is hereby incorporated by reference.

TECHNICAL FIELD

The present disclosure relates to diversity combining in a radio signal receiver.

BACKGROUND

Antenna diversity is widely employed in base station receivers to improve uplink performance. The redundancy that is provided by the multiple antennas can be utilized in a variety of interference suppression techniques of varying complexity.

For example, in the 3GPP standard long term evolution (LTE) single-carrier frequency-division multiple access (SC-FDMA) is utilized as the uplink access technology and frequency domain equalization (FDE) is a necessary receiving technique in SC-FDMA to mitigate the interference caused by multi-path propagation. One type of receiver used for this purpose is the so-called interference-rejection-combining (IRC) receiver. In an IRC receiver, linear minimum mean square error (MMSE) antenna combining is performed in the frequency domain followed by frequency domain equalization.

In some more detail, as the skilled person will realize, in order to perform linear MMSE antenna combining, impairment co-variance is estimated on each sub-carrier in addition to the channel estimation. The basic impairment covariance estimate can be based on channel estimates for a number of sub-carriers, typically one resource block (RB). Averaging of multiple basic covariance estimates can be performed to reduce the impact of noise further. Then the inverse matrix of impairment co-variance is used for each sub-carrier to calculate weights for use in MMSE antenna combining.

In the prior art, impairment co-variance estimation is typically performed by averaging the basic co-variance estimate over a set of sub-carriers, say 12 sub-carriers in one RB. It is a relatively simple process and it works reasonably well with 2-antenna reception. However the performance gap from an ideal IRC receiver is too large, as will be illustrated in further detail below, if the number of receiving antennas are large, for example 8.

Furthermore, another issue with many IRC receivers in the prior art is the complexity of matrix inversion, especially when many receiving antennas are involved and large bandwidth is allocated. Needless to say, an 8×8 matrix inversion is much more complicated than a 2×2 matrix inversion.

SUMMARY

It is an object to obviate at least some of the above disadvantages and provide improved diversity combining that provides an advantageous balance between complexity and performance.

This object is achieved, according to a first aspect, by providing a method for diversity combining in a radio signal receiver that comprises reception of a transmitted signal on at least two antennas such that at least two received signal pairs exist. Each received signal pair comprises a received signal distributed over a first plurality of subcarrier frequencies polarized along a first direction and a received signal distributed over the first plurality of subcarrier frequencies polarized along a second direction.

The received signals polarized along the first direction are wideband combined such that a first combined received signal exists that is distributed over a second plurality of subcarrier frequencies, the second plurality being smaller than the first plurality. The received signals polarized along the second direction are wideband combined such that a second combined received signal exists that is distributed over the second plurality of subcarrier frequencies. The first and second combined received signals are then narrowband combined such that a diversity combined signal exists.

In other words, a hybrid combining method is provided that first performs wideband combining to combine signals distributed over a first plurality of subcarrier frequencies from antennas in the same polarization direction, resulting in a wideband combined signal for each polarization direction that is distributed over a number of subcarrier frequencies that is smaller than the first plurality of subcarrier frequencies. Two-port narrowband combining is then done of these wideband combined signals for the two polarization directions, resulting in a diversity combined signal.

The wideband combining can comprise a maximum ratio combining, MRC, procedure or a first interference rejection combining, IRC, procedure. Moreover, a selection criterion based on a performance to complexity ratio between such MRC and IRC procedures can be used to select whether to perform the MRC procedure or the first IRC procedure.

The narrowband combining of the first and second combined received signals can comprise a second interference rejection combining, IRC, procedure.

Embodiments include those where the transmitted signal is an uplink single carrier frequency division multiple access, SC-FDMA, signal in a 3rd Generation Partnership Project, 3GPP, Long Term Evolution, LTE, mobile communication system.

Such embodiments can comprise those wherein the wideband combining of the received signals polarized along the first direction and the wideband combining of the received signals polarized along the second direction comprise combining, using a first plurality of weighting vectors, the signals over a frequency interval of all subcarrier frequencies allocated to the uplink SC-FDMA signal, wherein said first plurality of weighting vectors have a first same value for all subcarrier frequencies allocated to the uplink SC-FDMA signal.

Such embodiments can also comprise those wherein the narrowband combining of the first and second combined received signals comprises combining, using a second plurality of weighting vectors, the signals over a frequency interval of a subset of all subcarrier frequencies allocated to the uplink SC-FDMA signal, wherein said second plurality of weighting vectors have a second same value for all subcarrier frequencies in the subset of all subcarrier frequencies allocated to the SC-FDMA uplink signal.

In other words, embodiments are provided that can be seen as a hybrid IRC receiver, which enables a decreased implementation complexity while maintaining/achieving good performance in comparison with a state-of-the-art full IRC in receivers having cross-polarized antenna systems.

The object is also achieved, according to a second aspect, by providing a radio signal receiver comprising receiving circuitry, wideband combining circuitry and narrowband combining circuitry. The receiving circuitry comprises circuitry configured to receive a transmitted signal from at least two antennas such that at least two received signal pairs exist, each received signal pair comprising a received signal distributed over a first plurality of subcarrier frequencies polarized along a first direction and a received signal distributed over the first plurality of subcarrier frequencies polarized along a second direction. The wideband combining circuitry comprises circuitry configured to wideband combine the received signals polarized along the first direction such that a first combined received signal exists that is distributed over a second plurality of subcarrier frequencies, the second plurality being smaller than the first plurality and configured to wideband combine the received signals polarized along the second direction such that a second combined received signal exists that is distributed over the second plurality of subcarrier frequencies. The narrowband combining circuitry comprises circuitry configured to narrowband combine the first and second combined received signals such that a diversity combined signal exists.

The effects and advantages of the second aspect receiver correspond to those summarized above in connection with the first aspect method.

DETAILED DESCRIPTION OF EMBODIMENTS

Figure 1:
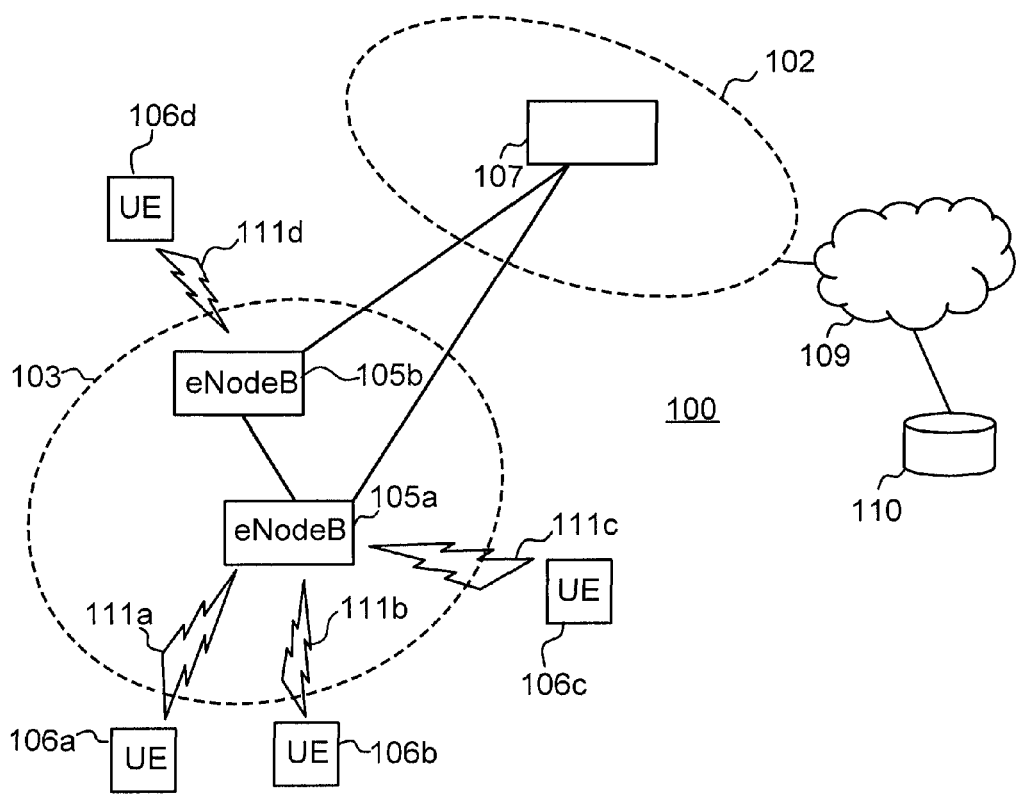
FIG. 1 illustrates schematically a mobile communication system.

FIG. 1 illustrates schematically a mobile communication system 100 in which a plurality of communication terminals 106a-d communicate via respective radio interfaces 111a-d with radio base stations 105a-b in a radio access network 103. The system 100 in FIG. 1 is a 3GPP LTE system and hence, as indicated, the communication terminals 106a-d are in the form of so-called user equipment, UE, and the radio base stations 105a-b are in the form of interconnected enhanced NodeB, eNodeB. The radio access network 103 is connected to a core network 102 in which a plurality of interacting entities are schematically represented by a single functional node 107. The core network 102 is connected to a data communication network 109 to which a data communication entity 110 is attached.

The purpose of FIG. 1 is to illustrate an exemplifying environment in which a diversity combining method and a diversity radio signal receiver can operate. Needless to say, a typical implementation of a system such as the system 100 in FIG. 1 comprises a large number of communicating units such as eNodeB's and UE's. Furthermore, no detailed description is necessary regarding the general operation of the entities in the system 100, the skilled person will consult the appropriate 3GPP standard documentation in order to implement the system.

Figure 2:
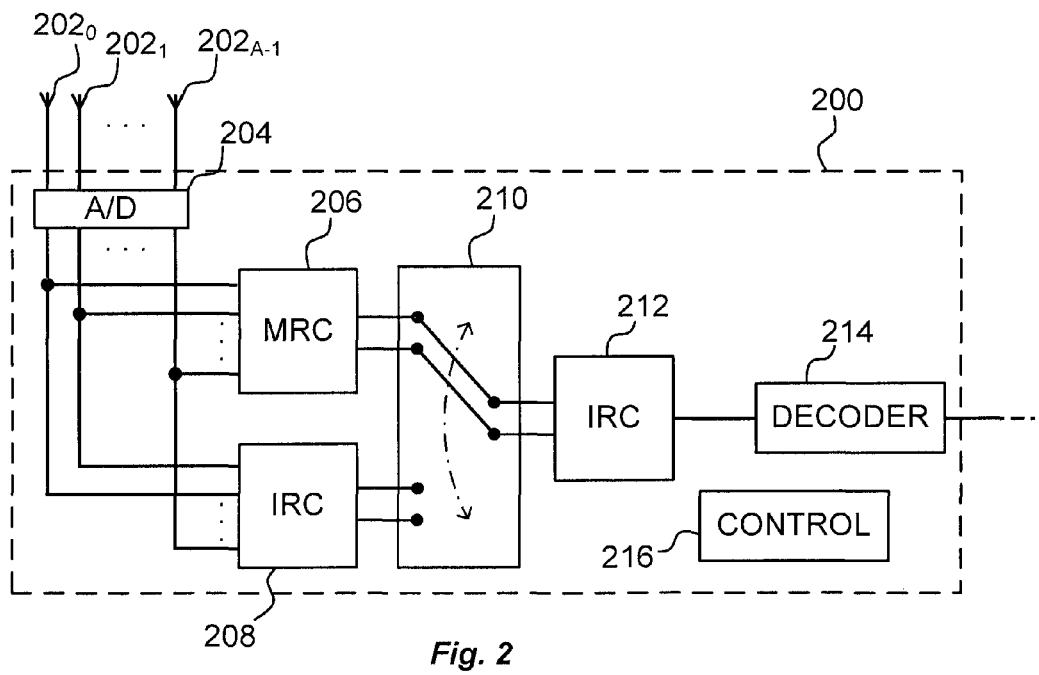
FIG. 2 illustrates schematically a radio signal receiver.

FIG. 2 illustrates schematically a radio signal receiver 200 that can form part of any of the base stations 105a-b in FIG. 1. The receiver 200 comprises a plurality of antennas 202 that are spatially spaced with respect to each other, as will be discussed below. The total number of antennas is A, as indicated by the index number interval (0, . . . , A−1). The antennas 202 receive radio signals from UE's 106 and the antennas 202 are configured such that they provide signal pairs, after processing in an analog processing unit 204, along a first and a second polarization direction. The signal pairs corresponding to all antennas 202 are provided from the analog processing unit 204 to a maximum ratio combining, MRC, unit 206 and to a first interference rejection combining, IRC, unit 208. As will be described in detail below, the MRC unit 206 and the first IRC unit 208 operate such that they each provide an output signal pair corresponding to signals received by the antennas along two different polarization directions. The signal pairs output from the MRC unit 206 and the first IRC unit 208 can be switched by a switch 210 to a second IRC unit 212, as will be described in some detail below. The second IRC unit 212 outputs a combined signal to decoding circuitry 214, in which further signal processing is performed, the details of which depend on the specific signals involved. The operation of the decoding circuitry 214 is outside the scope of the present disclosure. Furthermore, as the skilled person will realize, the operation of the units comprised in the radio signal receiver 200 is controlled by control circuitry 216. The control circuitry is connected to all units 204, 206, 208, 210, 212, 214 in the receiver 200, as the skilled person will realize. However, in order not to clutter the illustration, these connectors have been omitted from FIG. 2. Furthermore, electric power is supplied to the receiver 200 via power connectors and power units not shown in FIG. 2.

Figure 3:
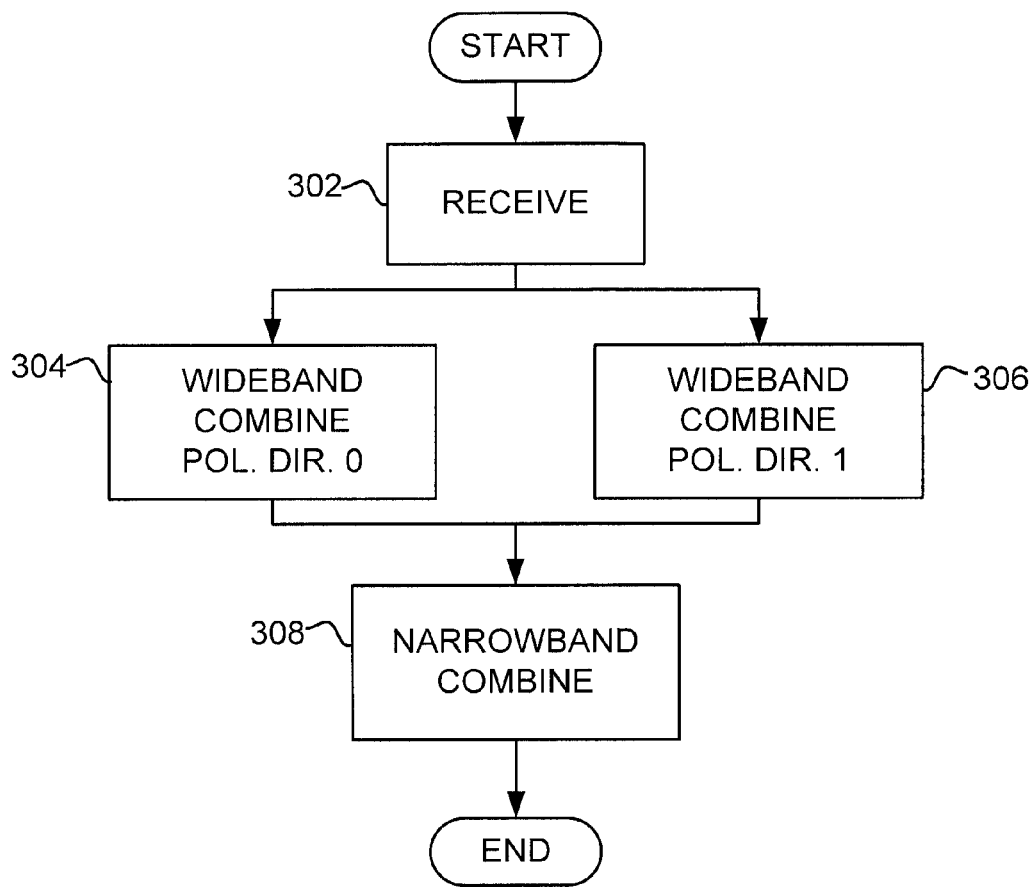
FIG. 3 is a flowchart of a diversity combining method.

Turning now to FIG. 3, and with continued reference to FIGS. 1 and 2, diversity combining of signals received at a base station such as a NodeB 105a in FIG. 1 will be described in some more detail. As summarized above, an initial reception step 302 comprises reception of a transmitted signal on at least two antennas such that at least two received signal pairs exist. Each received signal pair comprises a received signal distributed over a first plurality of subcarrier frequencies polarized along a first direction and a received signal distributed over the first plurality of subcarrier frequencies polarized along a second direction. The received signals polarized along the first and second directions are then wideband combined in one of two combining steps 304, 306 such that a first and a second combined received signal exist that are distributed over a second plurality of subcarrier frequencies, the second plurality being smaller than the first plurality. The first and second combined received signals are then narrowband combined in a combining step 308 such that a diversity combined signal exists.

In some more detail, the method commences with the reception step 302 in which signals are received in a receiver 200 in the NodeB 105a via a plurality of antennas 202. Assuming the uplink signal 111 received via antenna a at the receiver 200 in the frequency domain is as:

$$Y_a(m) = \sum_{j=0}^{J-1} H_{j,a}(m) \cdot X_j(m) + N_a(m),$$

$$m = 0, 1, \ldots, M-1;$$

$$a = 0, \ldots, A-1$$

where a is the antenna index and there are a total of A receiving antennas 202. There are J simultaneous users, i.e. UE's 106 and j is the UE index. M is the number of sub-carriers allocated to the desired UE, i.e. the UE from whose perspective the method is performed and $X_j(m)$ is the transmit signal on sub-carrier m in frequency domain of UE j, $$E[X_i(m) \cdot X_j(m-n)^*] = \begin{cases} 0, & i \neq j \\ M \cdot \delta(n) & i = j \end{cases}$$

$$(i, j) \in [0, \ldots, J-1]$$

$N_a$ is the thermal noise introduced in received signal from antenna a by the hardware in the receiver 200:

$$E[N_a(m) \cdot N_b(m-n)^*] = \begin{cases} 0, & a \neq b \\ \sigma_n^2 \cdot M \cdot \delta(n) & a = b \end{cases}$$

where a and b are antenna indices and $(m,n)\epsilon[0,\ldots,M-1]$ and where $\sigma_n^2$ is the noise power on subcarrier n.

$H_{j,a}(m)$ is the frequency domain channel from UE j to antenna a at the eNodeB 105a of the studied cell.

Out of the J simultaneously transmitting UE's only UE k is the desired UE served by the studied cell, and all the others are interfering UE's served by neighboring cells. For example, with reference to FIG. 1, if UE 106a is considered as the desired UE, then UE 106d will be an interfering UE.

The antennas 202 are linearly spaced with a separation of fractional wavelength, for example 0.5-0.7 wavelength, between two adjacent antennas, and antenna 0, 1, ..., $$\frac{A}{2} - 1$$

belong to polarization direction 0, and antenna $$\frac{A}{2}, \frac{A}{2}+1, \ldots, A-1$$

belong to polarization direction 1, perpendicular to polarization direction 0.

After the commencing reception step 302, steps 304, 306 of wideband combining the signals from the antennas 202 take place. In these steps, combining weights are calculated for each polarization direction followed by signal combining for each polarization direction. This calculation can be performed in two different ways: by way of a wideband MRC process or by way of a wideband IRC process. Selection of which of the MRC and IRC process to use is made based on an estimated performance to complexity ratio for the two processes.

Wideband MRC Process

In case the wideband MRC process is used, the combining weight is calculated using estimated channel only. For each polarization direction, the channel on the first antenna (i.e. antennas 0 and A/2) is the base to calculate a correlation vector, then the results are normalized to get the combining weight.

$$V_0 = \begin{bmatrix} v_{0,0} & v_{0,1} & \cdots & v_{0,\frac{A}{2}-1} \end{bmatrix}^T$$

$$\text{where } v_{0,a} = \sum_{m=0}^{M-1} \hat{H}_{k,0}(m)\left(\hat{H}_{k,a}(m)\right)^*$$

$$V_1 = \begin{bmatrix} v_{1,0} & v_{1,1} & \cdots & v_{1,\frac{A}{2}-1} \end{bmatrix}^T$$

$$\text{where } v_{1,a} = \sum_{m=0}^{M-1} \hat{H}_{k,\frac{A}{2}}(m)\left(\hat{H}_{k,a+\frac{A}{2}}(m)\right)^*$$

for polarization direction 0 and 1, respectively and where $\hat{H}$ is the estimated frequency domain channel for the desired UE k.

The combining weights are then calculated by:

$$W_0 = \frac{V_0}{v_{0,0}} = \begin{bmatrix} 1 & w_{0,1} & \cdots & w_{0,\frac{A}{2}-1} \end{bmatrix}^T$$

$$\text{where } w_{0,a} = \frac{v_{0,a}}{v_{0,0}}$$

$$W_1 = \frac{V_1}{v_{1,0}} = \begin{bmatrix} 1 & w_{1,1} & \cdots & w_{1,\frac{A}{2}-1} \end{bmatrix}^T$$

$$\text{where } w_{1,a} = \frac{v_{1,a}}{v_{1,0}}$$

Wideband IRC

In case the wideband IRC process is used, the combining weight is calculated using estimated channel and a wideband impairment co-variance matrix.

The impairment samples for each antenna are calculated:

$$\hat{N}_a(m) = Y_a(m) - \hat{H}_{k,a}(m) \cdot X_k(m)$$

$$a \epsilon [0,\ldots,A-1]$$

Then the wideband impairment co-variance matrix is calculated for polarization direction 0 and polarization direction 1, respectively:

$$R_0(i,j) = \frac{1}{M} \cdot \sum_{m=0}^{M-1} \hat{N}_i(m) \cdot \left(\hat{N}_j(m)\right)^*$$

$$i = 0, 1, \ldots, \frac{A}{2} - 1;$$

$$j = 0, 1, \ldots, \frac{A}{2} - 1$$

$$R_1(i,j) = \frac{1}{M} \cdot \sum_{m=0}^{M-1} \hat{N}_{i+\frac{A}{2}}(m) \cdot \left(\hat{N}_{j+\frac{A}{2}}(m)\right)^*$$

$$i = 0, 1, \ldots, \frac{A}{2} - 1;$$

$$j = 0, 1, \ldots, \frac{A}{2} - 1$$

Then the combining weights $W_0$ and $W_1$ for polarization directions 0 and 1, respectively, are calculated:

$$\hat{V}_0 = \begin{bmatrix} \hat{v}_{0,0} & \hat{v}_{0,1} & \cdots & \hat{v}_{0,\frac{A}{2}-1} \end{bmatrix}^T = ((R_0)^{-1}(V_0)^*)^*$$

$$\hat{V}_1 = \begin{bmatrix} \hat{v}_{1,0} & \hat{v}_{1,1} & \cdots & \hat{v}_{1,\frac{A}{2}-1} \end{bmatrix}^T = ((R_1)^{-1}(V_1)^*)^*$$

$$W_0 = \frac{\hat{V}_0}{\hat{v}_{0,0}} = \begin{bmatrix} 1 & w_{0,1} & \cdots & w_{0,\frac{A}{2}-1} \end{bmatrix}^T$$

$$\text{where } w_{0,a} = \frac{\hat{v}_{0,a}}{\hat{v}_{0,0}}$$

$$W_1 = \frac{\hat{V}_1}{\hat{v}_{1,0}} = \begin{bmatrix} 1 & w_{1,1} & \cdots & w_{1,\frac{A}{2}-1} \end{bmatrix}^T$$

$$\text{where } w_{1,a} = \frac{\hat{v}_{1,a}}{\hat{v}_{1,0}}$$

where $V_0$ and $V_1$ are calculated as described above in connection with the wideband MRC process.

Signal combining for each polarization direction then takes place. With the calculated combining weights, signals from antennas in the same polarization direction are combined together:

$$Y'_p(m) = Y_p(m) W_p$$

$$= \left[ Y_{p \times \frac{A}{2}+0}(m) Y_{p \times \frac{A}{2}+1}(m) \ldots Y_{p \times \frac{A}{2}+\frac{A}{2}-1}(m) \right]$$

$$\left[ 1 \quad w_{p,1} \quad \ldots \quad w_{p,\frac{A}{2}-1} \right]^T$$

$$= \sum_{a=0}^{A/2-1} Y_{p \times \frac{A}{2}+a}(m) \cdot w_{p,a}$$

where p=0, 1 denote the polarization direction index.

The combined estimated channel H'$_p$(m) is then calculated:

$$H'_p(m) = \hat{H}_p(m) W_p$$

$$= \left[ \hat{H}_{k,p \times \frac{A}{2}+0}(m) \hat{H}_{k,p \times \frac{A}{2}+1}(m) \ldots \hat{H}_{k,p \times \frac{A}{2}+\frac{A}{2}-1}(m) \right]$$

$$\left[ 1 \quad w_{p,1} \quad \ldots \quad w_{p,\frac{A}{2}-1} \right]^T$$

$$= \sum_{a=0}^{A/2-1} \hat{H}_{k,p \times \frac{A}{2}+a}(m) \cdot w_{p,a}$$

The combined impairment sample N'$_p$(m) is then calculated by:

$$N'_p(m) = \hat{N}_p(m) W_p$$

$$= \left[ \hat{N}_{p \times \frac{A}{2}+0}(m) \hat{N}_{p \times \frac{A}{2}+1}(m) \ldots \hat{N}_{p \times \frac{A}{2}+\frac{A}{2}-1}(m) \right]$$

$$\left[ 1 \quad w_{p,1} \quad \ldots \quad w_{p,\frac{A}{2}-1} \right]^T$$

$$= \sum_{a=0}^{A/2-1} \hat{N}_{p \times \frac{A}{2}+a}(m) \cdot w_{p,a}$$

Finally, the step of narrowband combining 308 takes place in the form of a two-port IRC process that produces a diversity combined signal.

The impairment covariance matrix, which is L resource blocks (RBs) based, is calculated by:

$$R'_n(i,j) = \frac{1}{N_{CS}^{RB} \times L} \sum_{m=(n-1) \times N_{CS}^{RB} \times L}^{n \times N_{CS}^{RB} \times L - 1} N'_i(m) \times (N'_j(m))^*$$

Where the polarization direction indices i=0, 1 and j=0, 1 n=0, 1, ..., $$\frac{M}{N_{SC}^{RB} \times L} - 1$$

denotes the covariance index. Every L RB has one correlation matrix where L is not less than 1 and no more than the total number of RBs in the system, and N$_{SC}^{RB}$ is the number of subcarriers in one RB.

Then two-port IRC is performed together with frequency domain equalization, FDE, in order to obtain the diversity combined signal $\hat{X}$(m):

$$\hat{X}(m) = \frac{1}{1 + \left( \begin{bmatrix} H'_0(m) \\ H'_1(m) \end{bmatrix} \right)^H \left( R_{\left[ \frac{m}{N_{SC}^{RB} \times L} \right]} \right)^{-1} \begin{bmatrix} H'_0(m) \\ H'_1(m) \end{bmatrix}} \cdot$$

$$\left( \left( R_{\left[ \frac{m}{N_{SC}^{RB} \times L} \right]} \right)^{-1} \begin{bmatrix} H'_0(m) \\ H'_1(m) \end{bmatrix} \right)^H \begin{bmatrix} Y'_0(m) \\ Y'_1(m) \end{bmatrix}$$

Simulation Results

Figure 4:
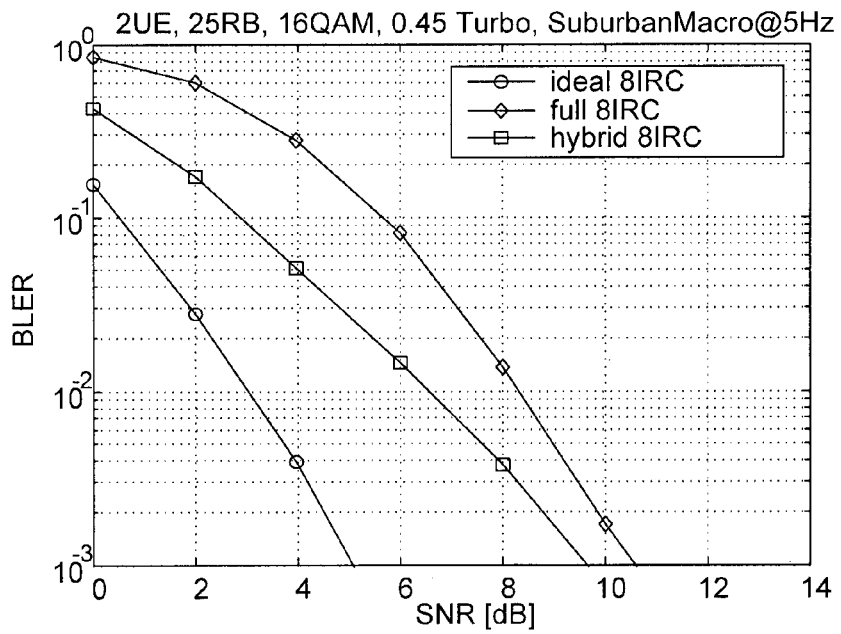
FIG. 4 is a graph that illustrates simulation results.

The above procedure has been performed and has yielded simulation results that are presented in the graph in FIG. 4. In the graph, results from running the above described procedure (denoted "hybrid 8IRC") are compared with an ideal 8 antenna IRC receiver (denoted "ideal 8IRC") and a state-of-the-art full IRC receiver (denoted "full 8IRC") with practical estimates on the channel and impairment co-variance. Discrete Fourier transform, DFT, based channel estimation with adaptive virtual over-sampling has been used. The virtual over-sampling rate is 1 for SNR less than 10 dB. The state-of-the-art impairment co-variance estimation algorithm has been adopted, which averages the raw co-variance estimate over 12 sub-carriers in one RB.

Two users (UE's) are simulated, namely a desired UE served by the studied cell and an interfering UE served by the neighboring cell. These two UE's have the same average received signal strength and interfere with each other in their respective uplink reception. The detailed simulation conditions are presented in the following table:

| Simulation parameter | Value |
|---|---|
| Standard | 3GPP LTE Release 8 |
| Physical channel | PUSCH |
| System bandwidth [MHz] | 20 |
| Channel propagation model | SCM-E Suburban Macro |
| Doppler frequency [Hz] | 5 |
| Number of occupied RBs by PUSCH | 25 |
| Modulation | 16QAM |
| Transport block size | 6456 (coding rate is roughly 0.45) |
| Antennas at the eNodeB | cross-polarized 8 antennas 0.7 wavelength antenna separation 90 degree antenna HPBW |
| Receiver types | full IRC, hybrid IRC (utilizing the wideband IRC process) |
| Average DoA observed at eNodeB of the studied cell [degree] | 30 for the desired UE −30 for the interfering UE |
| Channel estimation algorithm | DFT based with adaptive virtual over-sampling |
| Impairment co-variance estimation algorithm | the raw co-variance estimate averaged over 12 sub-carriers in one RB |

FIG. 4 shows results from the simulation, and it can be concluded that:

The state-of-art 8-antenna full IRC receiver with practical channel and impairment co-variance estimates has a performance loss of about 5.5 dB comparing to an ideal 8-antenna IRC with perfect estimates.

With the 8-antenna hybrid IRC receiver the performance loss is reduced to about 2.5-4.5 dB.

Even though the hybrid IRC process reduces the complexity associated with matrix inversion compared to that of the full IRC, performance is not sacrificed. In fact, the hybrid IRC process has a performance improvement of about 1~2.5 dB in the simulated scenario compared to the state-of-art full IRC for the case of cross-polarized 8 antennas.

The invention claimed is:

1. A method for diversity combining in a radio signal receiver, comprising:
   receiving a transmitted signal on at least two antennas such that at least two received signal pairs exist, each received signal pair comprising a received signal distributed over a first plurality of subcarrier frequencies polarized along a first direction and a received signal distributed over the first plurality of subcarrier frequencies polarized along a second direction,
   wideband combining the received signals polarized along the first direction such that a first combined received signal exists that is distributed over a second plurality of subcarrier frequencies, the second plurality being smaller than the first plurality,
   wideband combining the received signals polarized along the second direction such that a second combined received signal exists that is distributed over the second plurality of subcarrier frequencies, and
   narrowband combining the first and second combined received signals such that a diversity combined signal exists.

2. The method of claim 1, wherein the wideband combining of the received signals polarized along the first direction and the wideband combining of the received signals polarized along the second direction comprise a maximum ratio combining (MRC) procedure.

3. The method of claim 2, comprising:
   selecting to perform the MRC procedure or to perform a first interference rejection combining, (IRC) procedure, wherein the selection comprises at least one selection criterion based on a respective performance to complexity ratio for the MRC procedure and the first IRC procedure.

4. The method of claim 1, wherein the wideband combining of the received signals polarized along the first direction and the wideband combining of the received signals polarized along the second direction comprise a first interference rejection combining (IRC) procedure.

5. The method of claim 4, comprising:
   selecting to perform the first IRC procedure or to perform a maximum ratio combining (MRC) procedure, wherein the selection comprises at least one selection criterion based on a respective performance to complexity ratio for the first IRC procedure and the MRC procedure.

6. The method of claim 1, wherein the narrowband combining of the first and second combined received signals comprises a second interference rejection combining (IRC) procedure.

7. The method of claim 1, wherein the transmitted signal is an uplink single carrier frequency division multiple access (SC-FDMA) signal in a 3rd Generation Partnership Project (3GPP) Long Term Evolution (LTE) mobile communication system.

8. The method of claim 7, wherein the wideband combining of the received signals polarized along the first direction and the wideband combining of the received signals polarized along the second direction comprise,
   combining, using a first plurality of weighting vectors, the signals over a frequency interval of all subcarrier frequencies allocated to the uplink SC-FDMA signal, wherein said first plurality of weighting vectors have a first same value for all subcarrier frequencies allocated to the uplink SC-FDMA signal.

9. The method of claim 7, wherein the narrowband combining of the first and second combined received signals comprises combining, using a second plurality of weighting vectors, the signals over a frequency interval of a subset of all subcarrier frequencies allocated to the SC-FDMA uplink signal, wherein said second plurality of weighting vectors have a second same value for all subcarrier frequencies in the subset of all subcarrier frequencies allocated to the SC-FDMA uplink signal.

10. A radio signal receiver comprising:
    receiving circuitry comprising circuitry configured to receive a transmitted signal from at least two antennas such that at least two received signal pairs exist, each received signal pair comprising a received signal distributed over a first plurality of subcarrier frequencies polarized along a first direction and a received signal distributed over the first plurality of subcarrier frequencies polarized along a second direction,
    wideband combining circuitry comprising circuitry configured to wideband combine the received signals polarized along the first direction such that a first combined received signal exists that is distributed over a second plurality of subcarrier frequencies, the second plurality being smaller than the first plurality and configured to wideband combine the received signals polarized along the second direction such that a second combined received signal exists that is distributed over the second plurality of subcarrier frequencies, and
    narrowband combining circuitry comprising circuitry configured to narrowband combine the first and second combined received signals such that a diversity combined signal exists.

11. The receiver of claim 10, where the wideband combining circuitry comprises a maximum ratio combining (MRC) circuit.

12. The receiver of claim 10, where the wideband combining circuitry comprises a first interference rejection combining (IRC) circuit.

13. The receiver of claim 10, where the narrowband combining circuitry comprises a second interference rejection combining (IRC) circuit.

14. The receiver of claim 10, where the receiving circuitry, the wideband combining circuitry, and the narrowband combining circuitry are configured to receive and combine an uplink single carrier frequency division multiple access (SC-FDMA) signal in a 3rd Generation Partnership Project (3GPP) Long Term Evolution (LTE) mobile communication system.

* * * * *